(No Model.)
2 Sheets—Sheet 1.
J. C. WRIGHT.
COMBINED PLANTER AND MARKER.
No. 602,383. Patented Apr. 12, 1898.
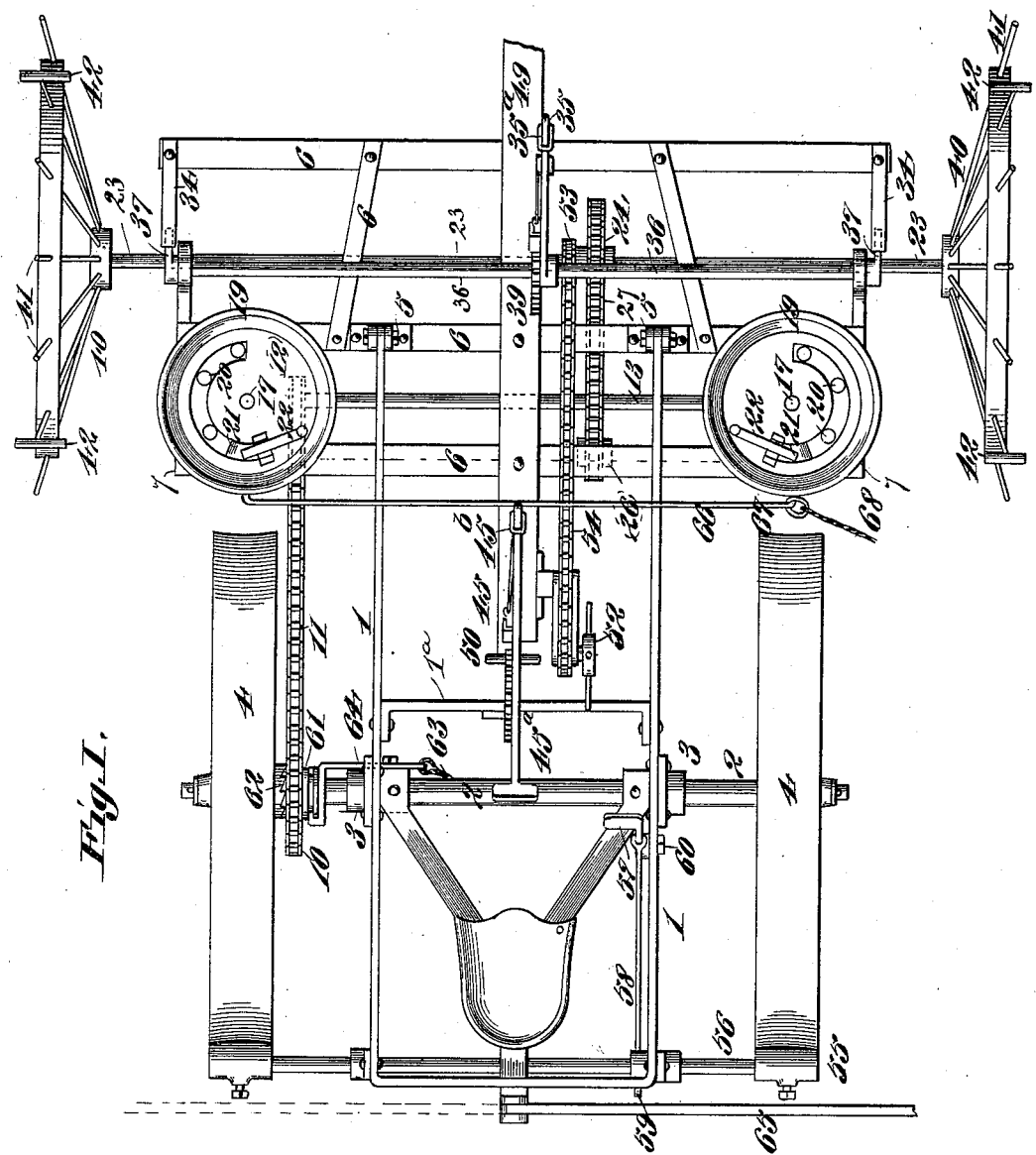
Fig. I.
Attest:
E. S. Wright
Stanley Stoner
Inventor:
James C. Wright
By Wright Bro
Atty's

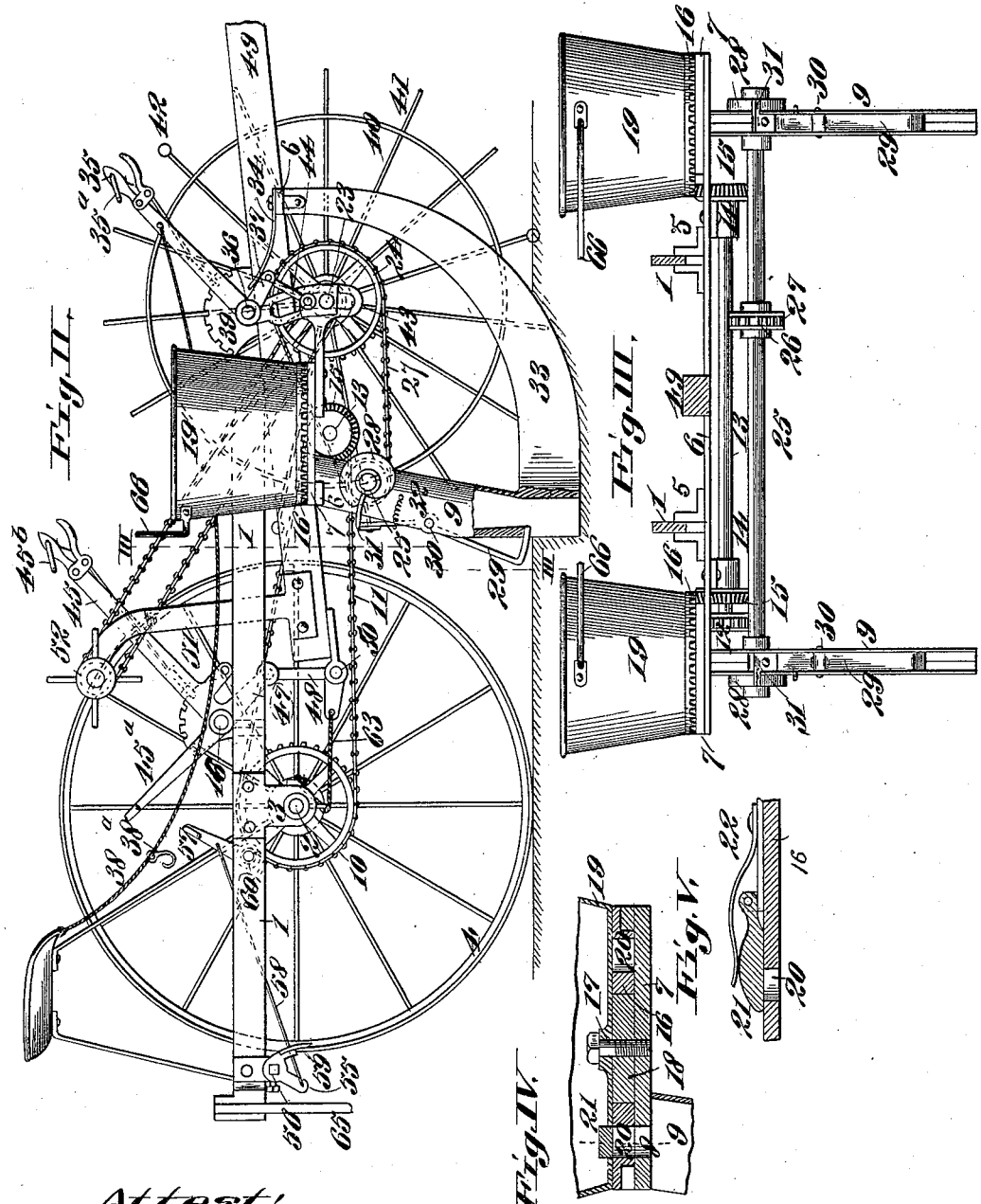

UNITED STATES PATENT OFFICE.

JAMES C. WRIGHT, OF LINCOLN, MISSOURI.

COMBINED PLANTER AND MARKER.

SPECIFICATION forming part of Letters Patent No. 602,383, dated April 12, 1898.

Application filed October 11, 1897. Serial No. 654,757. (No model.)

*To all whom it may concern:*

Be it known that I, JAMES C. WRIGHT, a citizen of the United States, residing at Lincoln, in the county of Benton and State of Missouri, have invented certain new and useful Improvements in a Combined Planter and Marker, of which the following is a full, clear, and exact description, reference being had to the accompanying drawings, forming a part of this specification.

The object of my invention is to provide an improved combined planter and marker so constructed as to be under the control of one person and manipulated by said person without the necessity of leaving the driver's seat. It possesses features of novelty both in the construction for automatically dropping the seed and for adjustment of parts by the operator. Such features are hereinafter fully described and claimed.

Referring to the drawings forming a part of this specification, Figure I shows a top plan view of the entire device. Fig. II shows a side elevation of the same, one of the drive-wheels and one of the marker-wheels being omitted and a portion of the seed guide or spout being broken away. Fig. III shows a vertical section looking toward the front, taken along the line III III of Fig. II. Fig. IV is a detail vertical section taken through the bottom of one of the seed-hoppers and the seat on which it rests. Fig. V is a detail vertical section of a portion of the bottom of one of the seed-hoppers, showing the dog or cut-off and means for regulating the quantity of seed deposited.

1 is the U-shaped main frame, on which the different parts are supported, having a central brace-piece 1ª.

2 is the main axle, which rides in hangers 3 on the frame 1 and is rigid with the drive-wheels 4.

Pivoted to the main frame 1 at its forward ends 5 is a second frame 6, the several parts of which are rigid. On each end of this frame 6 is a plate 7, which is furnished with an exit 8, leading into the seed guide or spout 9.

10 is a sprocket-wheel mounted on the axle 2 and receiving motion therefrom, as will afterward be described.

11 is a sprocket-chain riding on the wheel 10 and a second sprocket-wheel 12, which is rigid with the hopper-shaft 13. This shaft 13, supported by hangers 14 from the frame 6, carries a bevel-gear 15, which meshes with a toothed circular plate 16, resting on plate 7 and secured by and revolving about the pin 17.

18 is an interposed washer.

19 is a removable seed-hopper superposed on the plate 16 and held in place by the pin or screw 17. The plate 16 is provided with openings 20, adapted to come coincident with the opening 8 in the plate 7 as the plate revolves by means of the bevel-gear already described.

21 is a dog or cut-off held in place by the spring 22 and which serves to scrape superfluous seed from the opening leading to the seed guide or spout 9, so as to allow only a given amount to escape.

23 is a shaft connecting the marker-wheels to be hereinafter described, which is provided with a sprocket-wheel 24.

25 is a shaft supported in the seed guides or spouts 9 and provided with a sprocket-wheel 26.

27 is a sprocket-chain connecting wheels 24 and 26, by means of which motion is imparted to shaft 25.

28 are cams carried on the ends of the shaft 25 and revolved thereby.

29 is a dropping-lever pivoted in the side of the seed guide or spout 9 at 30, so formed that when its lower end closes the passage out of the seed guide or spout its upper end is open, and vice versa. 31 is an extension attached to the upper end of said dropping-lever 29 and held in place by a pull-spring 32, which bears against the cam 28, so that the rotation of said cam causes the dropping-lever 29 to alternately close and open, which action is accomplished by a simultaneous deposit of seed from the hoppers 19.

33 is a furrow-opener or shoe adapted to sink into the ground to a desired distance, which is immediately forward of the seed guide or spout 9 and which prepares the furrow for receiving the seed. It is held depressed by means of the spring 34, attached to the frame 6.

35 is a hand-lever of the ordinary construction, rigid with a shaft 36, which shaft is provided at its ends with arms 37. The lever 35 has attached a cord or chain 38, which enables the driver to operate the same without leaving his seat. This cord 38 is provided with a hook 38ª, adapted to be connected to the driver's seat. The hand-lever 35 is provided with a ring 35ª, that is adapted to engage the hand-grip of the lever 35, so that said lever may be manipulated by grasping the cord 38, after which the hook 38ª may be engaged with the driver's seat and the marker-wheels held from contact with the ground.

39 is a segmental plate secured to the pole 49, provided with notches for receiving the locking-tooth operated by the lever 35.

40 are marker-wheels provided with spokes 41 and transverse bars 42 on certain spokes. These marker-wheels are secured to the shaft 23. This shaft rides in grooves in slotted guides 43, rigid with the frame 6. 44 is a link connecting the arm 37 to the shaft 23. It will be readily seen that the rotating of this arm when the lever is operated will through the link 44 cause the shaft 23 to rise or fall. This permits the operator to readily lift the marker-wheels from touching the ground, as is necessary when turning or when the device is not being used for marking purposes.

45 is a second hand-lever, similar in construction to the hand-lever 35, which is within easy reach of the driver and which is adapted to rock the frame 6 on its pivoted forward ends 5. This hand-lever is pivoted to the frame 1 at 46 and carries an arm 47, which is connected by a link 48 to the rear end of the pole 49 at 50. This enables the frame 6 to be placed at any desired pitch, and since the furrow-opener or shoe 33 is rigid therewith the depth of the furrows may be by this means regulated. The hand-lever 45 has attached to it a treadle 45ª, which provides for the manipulation of the lever 45 by the foot of the driver instead of it being operated by the hand. When it is desired to control the movement of the lever 45 by means of the treadle, the hand-grip of the lever is drawn to the handle of said lever and held thereto by a ring 45ᵇ.

51 is an upright carried on the pole 49 and furnished with a hand-wheel 52.

53 is a sprocket-wheel carried on the shaft 23.

54 is a sprocket-chain connecting the two wheels 53 and 54. By this means when the shaft 23 and marker-wheels 40 are elevated the driver may revolve them to any desired position, so that the bars 42 are coincident with the hills of the last row planted in order to preserve uniformity of the rows.

55 are scraper-shoes carried on a shaft 56, operated by the foot of the driver through the means of the foot-piece 57, being connected by the rod 58 with the lug 59, said lug rotating the shaft which carries the scraper-shoes. The foot-piece 57 is pivoted to the frame 1 at 60. This affords an efficient means of cleaning the wheels 4.

The sprocket-wheel 10 is secured to a sleeve 61 on the axle 2, the outer side of which sleeve is supplied with teeth adapted to engage in the manner of a chuck a second sleeve 62, rigidly secured to the drive-wheel. Tension to keep these in engagement is maintained by means of a spring (not shown in the drawings) which may be controlled by the driver through the medium of the cord 63 and arm 64. By pulling this cord the spring is drawn back and the chuck thrown out of engagement. The sleeve 61, carrying the sprocket-wheel 10, thus receives no motion from the drive-wheel, and the dropping device remains at rest.

65 is a rod hinged to the rear end of the frame 1, to which is attached a marker-runner, (not shown,) this marker-runner being provided as an auxiliary to the marker-wheel before described.

66 is a rod secured to the seed-hoppers, on which a ring 67 is adapted to slide, said ring having connected thereto a cord 68, that leads to the marker-runner, the ring sliding on said rod when the auxiliary marker is thrown from side to side of the planter.

I claim as my invention—

1. A combined planter and marker comprising a main frame, an axle mounted in said frame, the supporting drive-wheels fixed to the axle, the second frame pivoted to the forward ends of the main frame, the hopper-plates having exits and mounted on the second frame, the seed-guides beneath the exits, the cam-shaft, having cams fixed thereto and mounted in the seed-guides, the dropping-levers pivoted to the seed-guides and having extensions bearing upon the cams, the marker-wheel shaft supported from the second frame, the furrow-openers extending from the seed-guides to the second frame, the marker-wheels fixed to the marker-wheel shaft, means for connecting the hopper-plates with the axle and means for connecting the marker-wheel shaft with the cam-shaft; substantially as described.

2. A combined planter and marker comprising a main frame, an axle mounted in said frame, the supporting drive-wheels fixed to the axle, the second frame pivoted to the forward ends of the main frame, the hopper-plates having exits, the hopper-shaft mounted on the second frame and having bevel-pinions, the toothed circular plates having seed-openings and meshed by the bevel-pinions and rotating on the hopper-plates, the interposed washers, the hoppers secured to the circular plates, and having an outlet to the seed-openings, the seed-guides beneath the exits of the hopper-plates, and connection between the axle and the hopper-shaft; substantially as described.

3. A combined planter and marker comprising a main frame, an axle mounted in said frame, the supporting drive-wheels fixed to the axle, the second frame pivoted to the forward ends of the main frame, the hopper-plates having exits and mounted on the second frame, the seed-guides beneath the exits, the cam-shaft having cams fixed thereto and mounted in the seed-guides, the dropping-levers pivoted to the seed-guides and having extensions bearing upon the cams, the marker-wheel shaft, the marker-wheels fixed to the marker-wheel shaft, the upright secured to the second frame, the hand-wheel mounted on the upright, means for connecting the hopper-plates with the axle, connections between the marker-wheel shaft and the cam-shaft, and connection between the hand-wheel and the marker-wheel shaft; substantially as described.

JAS. C. WRIGHT.

In presence of—
WM. H. LYNCH,
JOHN HENRY.